(12) United States Patent
Hojo et al.

(10) Patent No.: US 7,436,445 B2
(45) Date of Patent: Oct. 14, 2008

(54) IMAGE PICKUP AND DISPLAY DEVICE

(75) Inventors: Atsushi Hojo, Nara (JP); Yuji Tominaga, Neyagawa (JP); Hiromitsu Kimura, Kobe (JP); Hiroyuki Matsumoto, Hirakata (JP); Mizuho Sakakibara, Edogawa-ku (JP)

(73) Assignee: Matsushita Electric Industries Co., Ltd., Osaka (JP)

( * ) Notice: Subject to any disclaimer, the term of this patent is extended or adjusted under 35 U.S.C. 154(b) by 626 days.

(21) Appl. No.: 10/919,259

(22) Filed: Aug. 17, 2004

(65) Prior Publication Data

US 2005/0046726 A1    Mar. 3, 2005

(30) Foreign Application Priority Data

Aug. 29, 2003    (JP) ............................. 2003-305599

(51) Int. Cl.
*H04N 5/222*    (2006.01)
*H04N 5/225*    (2006.01)

(52) U.S. Cl. ............................ 348/333.01; 348/333.06; 348/373

(58) Field of Classification Search ............ 348/333.06, 348/373, 333.11, 333.12, 333.01
See application file for complete search history.

(56) References Cited

U.S. PATENT DOCUMENTS 5,982,429 A * 11/1999 Kamamoto et al. .... 348/333.06
6,091,450 A * 7/2000 Hirasawa ............... 348/333.01
7,046,286 B1 * 5/2006 Kobayashi et al. ..... 348/333.06

FOREIGN PATENT DOCUMENTS

JP    10-285444    10/1998
JP    2001-65540    3/2001

* cited by examiner

*Primary Examiner*—Lin Ye
*Assistant Examiner*—Hung H Lam
(74) *Attorney, Agent, or Firm*—Steptoe & Johnson LLP (57) ABSTRACT

An image pickup and display device including a body having an image pickup lens, a display unit capable of displaying an image and having a longitudinal side extending along a longitudinal side of the body in a folded state where the display unit is in close proximity to or abuts against the body, a first rotation shaft having an axis extending along a surface of the body, a rotation-supporting mount rotatably attached to the body through the first rotation shaft, and a second rotation shaft extending perpendicular to the first rotation shaft through the rotation-supporting mount and rotatably supporting the display unit with respect to the rotation-supporting mount. The second rotation shaft extends along a side of the display unit and a side of the body when the display unit is folded. With this, even when the body is in a stable horizontal position, the display unit can be viewed excellently by being rotated around the second rotation shaft.

5 Claims, 6 Drawing Sheets

PRIOR ART

IMAGE PICKUP AND DISPLAY DEVICE

TECHNICAL FIELD

1. Field of the Invention

The present invention relates to an image pickup and display device capable of moving a display unit to various positions.

2. Background Art

An image pickup and display device capable of storing taken moving picture or still image and capable of displaying such stored information is already known. As an image pickup and display device of this kind, Japanese Patent Application Laid-open No. 2001-65540 (patent document 1), Japanese Patent Application Laid-open No. H10-285444 (patent document 2) and the like disclose one capable of rotating a display unit comprising a liquid crystal display which displays images which are being stored or stored images so that the angle of the display unit can be changed to an easy-to-see angle.

Figure 5A:
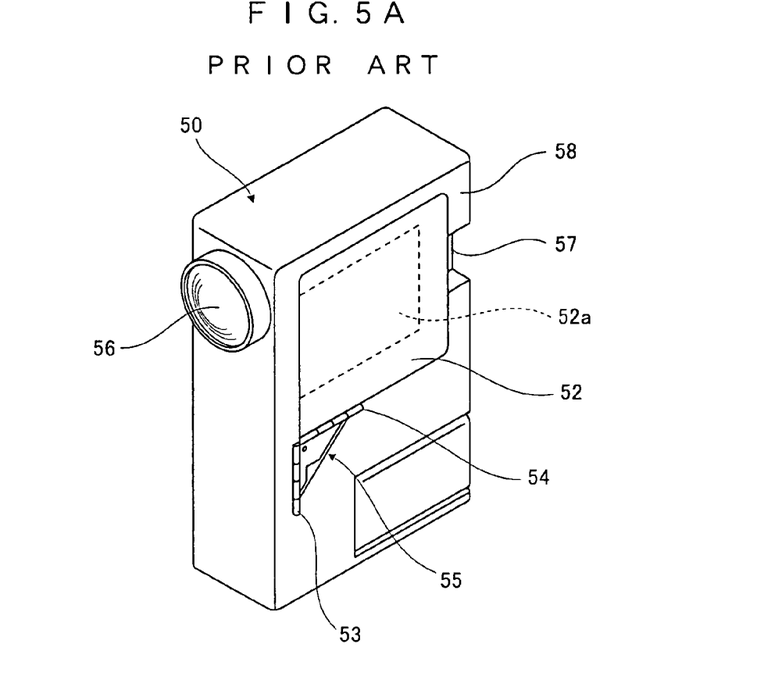
FIG. 5A is a perspective view of a conventional image pick up and display device, showing a state in which a display unit is folded and accommodated.
Figure 5B:
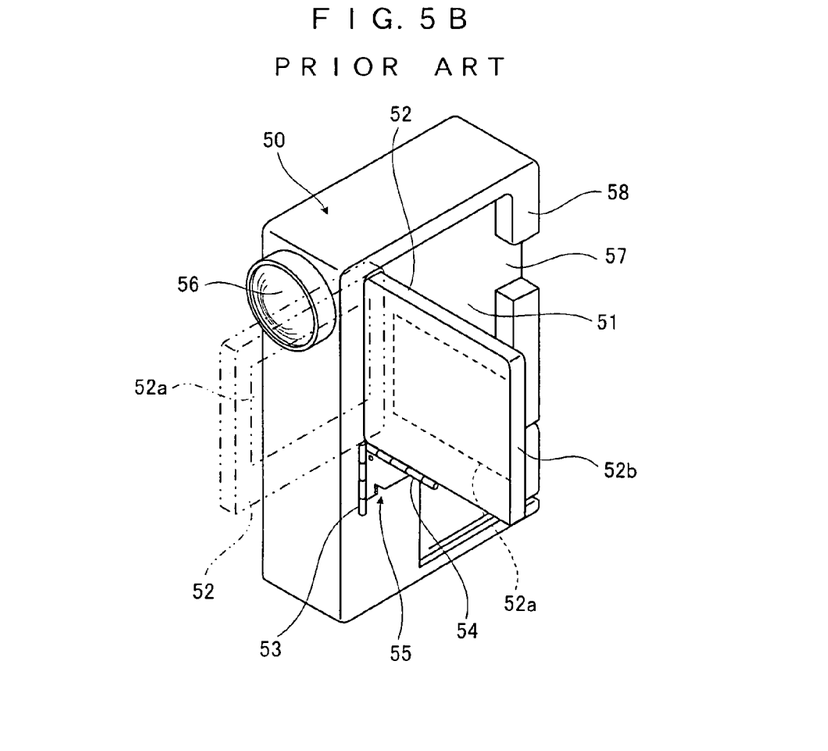
FIG. 5B is a perspective view of a conventional image pickup and display device, showing a state in which the display unit is erected from the folded state.
Figure 6A:
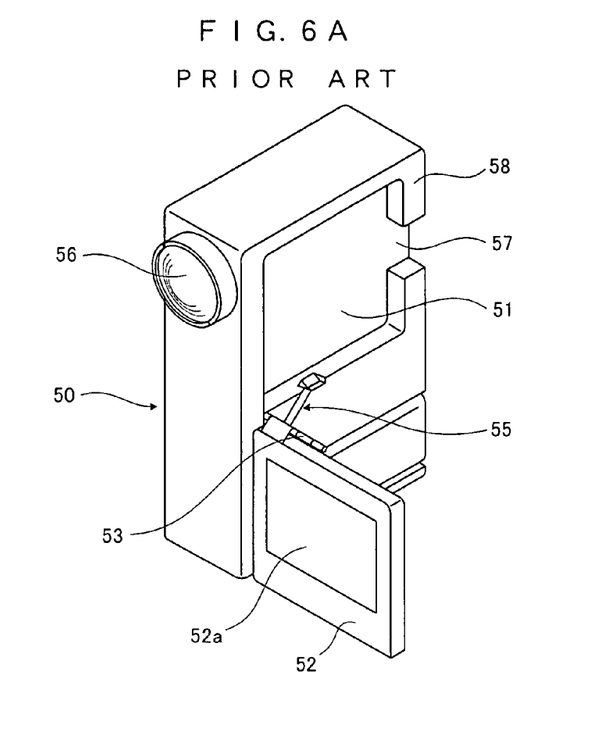
FIG. 6A is a perspective view of the conventional image pickup and display device, showing a state in which the display unit is erected from the folded state and is rotated.
Figure 6B:
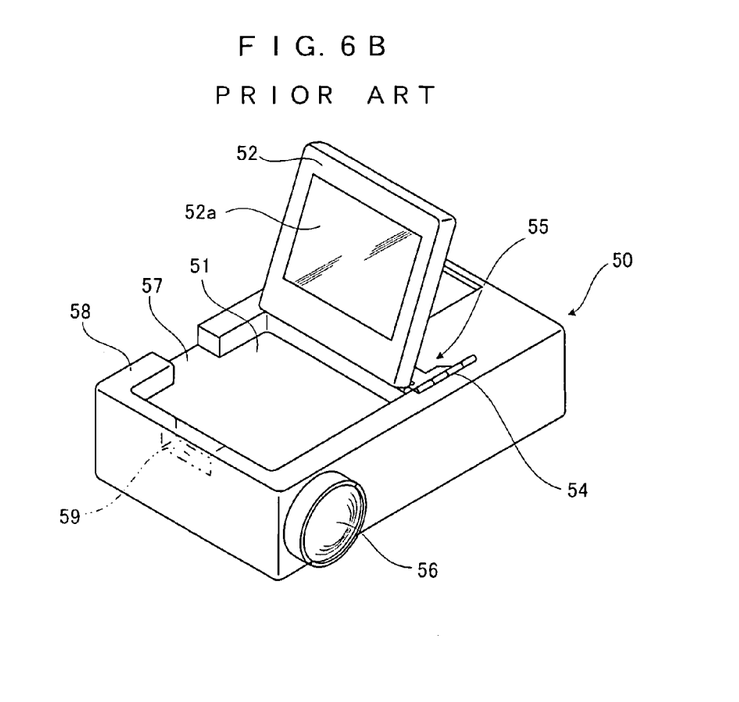
FIG. 6B is a perspective view of the conventional image pickup and display device, showing a state in which the display unit is erected into a horizontal position.

FIG. 5 and FIG. 6 show the image pickup and display device disclosed in patent document 1. In the image pickup and display device, an accommodation recess 51 is formed in an upper portion of one surface of a body 50 having image pickup means and the like. A display unit 52 comprising a liquid crystal screen can be accommodated in the accommodation recess 51 in a state in which the display unit 52 is folded. A biaxial hinge mechanism 55 is provided in a substantially vertically central location of the one surface of the body 50 which is adjacent to the accommodation recess 51. The biaxial hinge mechanism 55 includes a vertically extending first turning shaft 53, and a second turning shaft 54 laterally extending in a direction perpendicular to the first turning shaft 53. The display unit 52 can rotate around the first and second turning shafts 53 and 54 of the biaxial hinge mechanism 55. In FIG. 5 and FIG. 6, reference number 56 represents an image pickup and reference number 57 represents an insertion recess into which a finger is inserted when the display unit 52 accommodated in the accommodation recess 51 is to be taken out. The insertion recess 57 is formed by recessing a portion of an outer wall 58 which is provided such as to surround the accommodation recess 51.

With this structure, when a picture of a general subject (not user) is to be taken, if the display unit 52 is forwardly rotated around the first turning shaft 53 through about 90° as shown in FIG. 5B, the user can take a picture while viewing a display screen 52a of the display unit 52. When the user takes his or her own picture, if the display unit 52 is rotated around the second turning shaft 54 through about 180° as shown in FIG. 6A, the user can take his or her own picture while viewing the display screen 52a of the display unit 52.

In the image pickup and display device of such a structure, however, since the second turning shaft 54 mounted on the side of the display unit 52 is disposed at substantially vertically central location of the body 50, the display screen 52a of the display unit 52 can be set to only a half or smaller size of the side surface of the device body 50. Further, a longitudinal direction of the display unit 52 is different from that of the vertically long body 50. Thus, a large easy-to-see screen can not be used as compared with the body 50 and as a result, there is a problem that viewability is not so excellent.

Figure 7:
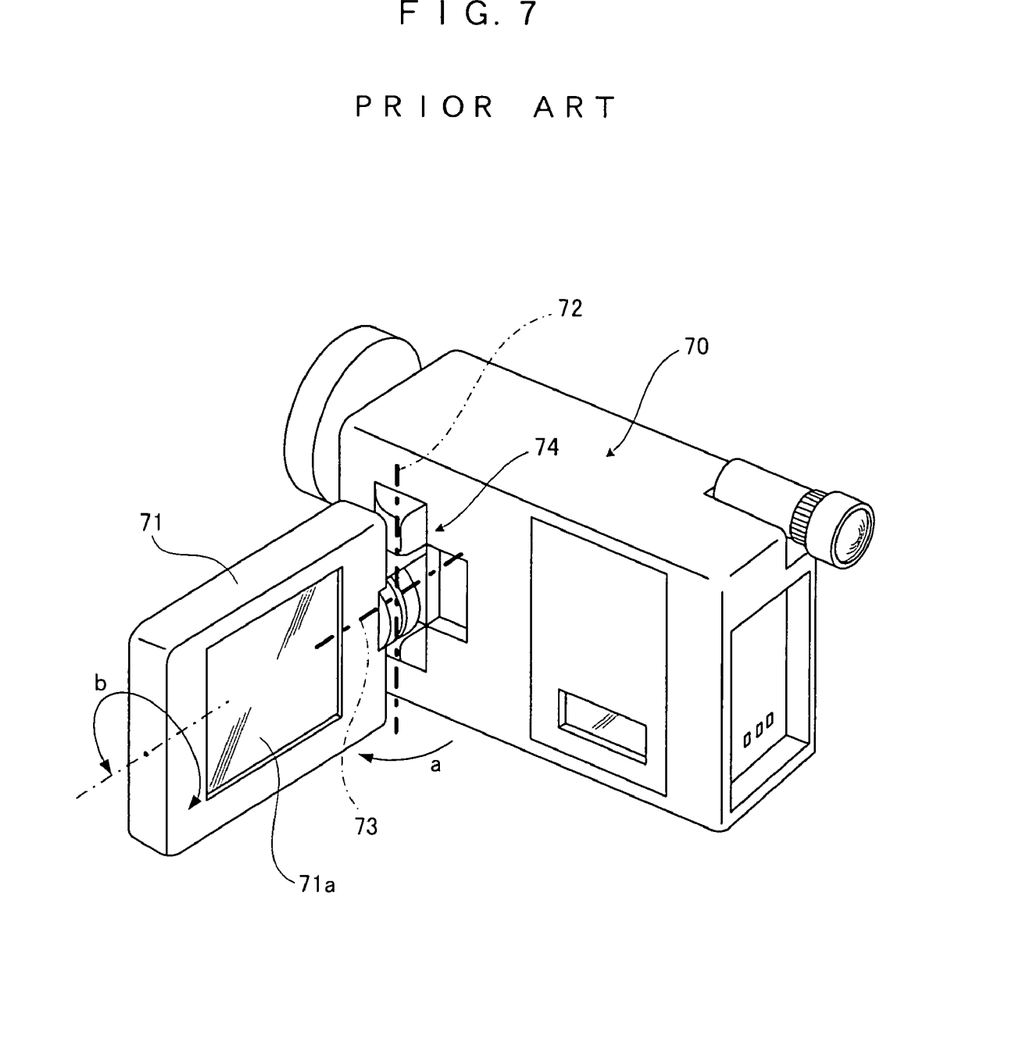
FIG. 7 is a perspective view of another conventional image pickup and display device.

On the other hand, patent document 2 discloses an image pickup and display device which is similar to that of patent document 1 in that the apparatus has two rotation shafts. As shown in FIG. 7, a substantially rectangular display unit 71 having a liquid crystal display 71a is disposed on one surface of a substantially rectangular body 70 having image pickup means and the like. The display unit 71 is disposed such that a longitudinal side of the display unit 71 extends along a longitudinal side of the body 70. A biaxial hinge mechanism 74 is disposed on a front end of the one surface of the body 70. The biaxial hinge mechanism 74 includes a vertically extending first turning shaft 72 and a second turning shaft 73 laterally extending in a direction perpendicular to the first turning shaft 72. The display unit 71 can rotate around the first and second turning shafts 72 and 73 of the biaxial hinge mechanism 74.

With such a structure, when a user takes a picture of a general subject except the user himself or herself, if the display unit 71 is rotated sideway (in a direction a) through about 90° around the first turning shaft 72 from the folded state along the body 70 as shown in FIG. 7, the user can take a picture while viewing the display screen 71a of the display unit 71. When the user takes his or her own picture, if the display unit 71 is rotated around the second turning shaft 73 (in a direction b) through about 180° from the above state, the user can take that picture while viewing the display screen 71a of the display unit 71.

According to this structure, the first turning shaft 72 is closer to the front side than the central portion so that the display unit 71 can open rearward, and a longitudinal side of the display unit 71 extends along a longitudinal side of the body 70. Therefore, the display screen 71a of the display unit 71 can be formed as large as a side surface of the body 70, an easy-to-see large screen can be used as the display screen 71a of the display unit 71, and the viewability becomes excellent.

In any of these conventional structures, it is possible to view the display unit 52, 71 while vertically holding the body 50, 70 with a hand at the time of image pickup. However, these structures are not suitable for viewing the display unit 52, 71 while turning the body 50 into a horizontal position to see already taken images.

That is, with the structure according to the patent document 1, in order to see the taken images in the horizontal position in which the body 50 is put on a table or the like (such a position that an opposite surface of the body 50 from a surface provided with the display unit 52 faces downward), the body 50 is directed horizontally in a position shown in FIG. 5B where the display unit 52 is forwardly rotated around the first turning shaft 53 through about 90° from the folded state shown in FIG. 5A to see the screen in this state, since a short side 52b separated away from the first turning shaft 53 comes upside, and the vertical side and the lateral side are reversed to cause a problem. Therefore, as shown with a virtual line in FIG. 5B, the display unit 52 can be forwardly rotated through about 180° around the first turning shaft 53 from the accommodated state. In this case, however, the user must view the display unit 52 from above, and the user becomes tired of long viewing. As another method, the display unit 52 can be rotated around the second turning shaft 54 through about 90° from the folded state as shown in FIG. 6B. However, a finger can not be inserted between the outer wall 58 and a long side of the display unit 52. Therefore, in this case, the user must pull out the display unit 52 from the accommodation recess 51 around the first turning shaft 53 and rotate the display unit 52 around the second turning shaft 54, and then the user must rotate toward the accommodation recess 51 around the first turning shaft 53, and there is a problem that lot of labors and time are required. It is possible to provide an insertion recess 59 for inserting a finger between the outer wall 58 and the long side of the display unit 52 as shown with a virtual line in FIG. 6B. If a plurality of insertion recesses 57 and 59 are provided, however, when a picture is to be taken using the image pickup and display device, a finger may be caught in the insertion recess 57 or 59, and this deteriorates ease of use.

With the structure according to the patent document 2, in order to see the taken images in the horizontal position in which the body 70 is put on a table or the like (such a position that an opposite surface of the body 70 from a surface provided with the display unit 71 faces downward), if the display unit 71 is rotated around the first turning shaft 72 from the folded state through about 90° to stand the display unit 71, the vertical side and lateral side are reversed.

DISCLOSURE OF THE INVENTION

The present invention solves the above problems, and it is an object of the invention to provide an image pickup and display device allowing a user to take a picture of a general subject or a picture of the user himself or herself while viewing the display unit, and allowing the user to see the display unit even in a state in which the body is placed in the stable horizontal position.

To achieve the above object, an image pickup and display device according to the first aspect of the invention comprises a body provided with image pickup means, a display unit which is capable of displaying an image and which is disposed such that its side in a longitudinal direction extends along a side of the body in the longitudinal direction in a folded state in which the display unit abuts against or close to the body, a first rotation shaft disposed such that its axis extends along a surface of the body, a rotation-supporting mount rotatably attached to the body through the first rotation shaft, and a second rotation shaft which is disposed perpendicular to the first rotation shaft in the rotation-supporting mount and which supports the display unit such that the display unit can rotate with respect to the rotation-supporting mount, and the second rotation shaft is disposed such that the second rotation shaft or a portion thereof extends along a side of the display unit and a side of the body when the display unit is folded.

According to this structure, even in the state in which the body is placed in the stable horizontal position, the user can excellently see the display unit by rotating the display unit around the second rotation shaft. When the user sees the display unit during image pickup, if the display unit is turned around the first rotation shaft such that the display unit stands with respect to the body and then the display unit is rotated around the second rotation shaft, the user can take a picture of a general subject or himself or herself while viewing the display unit. The display unit is disposed such that a side thereof in the longitudinal direction extends along the body and the second rotation shaft or a portion thereof extends along the side of the display unit and the side of the body when the display unit is folded. Therefore, an easy-to-see large screen can be used as the display screen of the display unit, and viewability becomes excellent.

According to a second aspect of the invention, in the image pickup and display device according to the first aspect, the display unit is formed such that an outer shape of the display unit except a side facing the rotation-supporting mount is substantially overlapped with an outer shape of the body as viewed from a direction perpendicular to a display surface of the display unit.

With this structure, a large display unit having the outer shape except a side facing the rotation-supporting mount is substantially overlapped with an outer shape of the body can be used as the display unit, and viewability of the display unit becomes extremely excellent.

According to a third aspect of the invention, in the image pickup and display device according to the first aspect, the apparatus further comprises first rotation shaft position detecting means which detects a position of the first rotation shaft, second rotation shaft position detecting means which detects a position of the second rotation shaft, and display position changing means which changes the display position of the display screen in accordance with the position detected by the first and second rotation shaft position detecting means.

With this structure, a position of the display unit caused when the display unit is rotated around the first and second rotation shafts to take a picture of a general subject while viewing the display unit, a position of the display unit caused when the display unit is rotated around the first and second rotation shafts to take a picture of a user while viewing the display unit, and a position of the display unit caused when the display unit is rotated around the second rotation shaft in a state where the body is put in the stable horizontal position can be detected by the first and second rotation shaft position detecting means, and the display state can be excellently switched suitably for that position by the display position changing means.

According to a fourth aspect of the invention, in the image pickup and display device according to the first aspect, an abutment projection which abuts against the display unit when the display unit is disposed in a fold position is curved into an arc shape which bends around the first rotation shaft.

According to this structure, when the display unit is opened around the second rotation shaft, since a side end surface of the display unit moves upward in a state in which the display unit abuts irrespective of the arc surface of the abutment projection, relatively large force is required for opening the display unit. On the other hand, when the display unit is opened around the first rotation shaft, since the side end surface of the display unit moves upward while rotating along the arc surface of the abutment projection, the display unit can be opened with small force. With this structure, a load required for opening the display unit can be varied depending upon the opening direction even though the number of parts is small.

According to the present invention, a display unit having a large easy-to-see screen can be viewed as the display unit while taking a picture of a general subject or a picture of a user, and even if the body is put in the stable horizontal position, the display unit can excellently be viewed, and the operability is enhanced.

DESCRIPTION OF THE PREFERRED EMBODIMENTS

Embodiments of the present invention will be explained below based on the drawings.

Figures 1A, 1B, 1C, 1D:
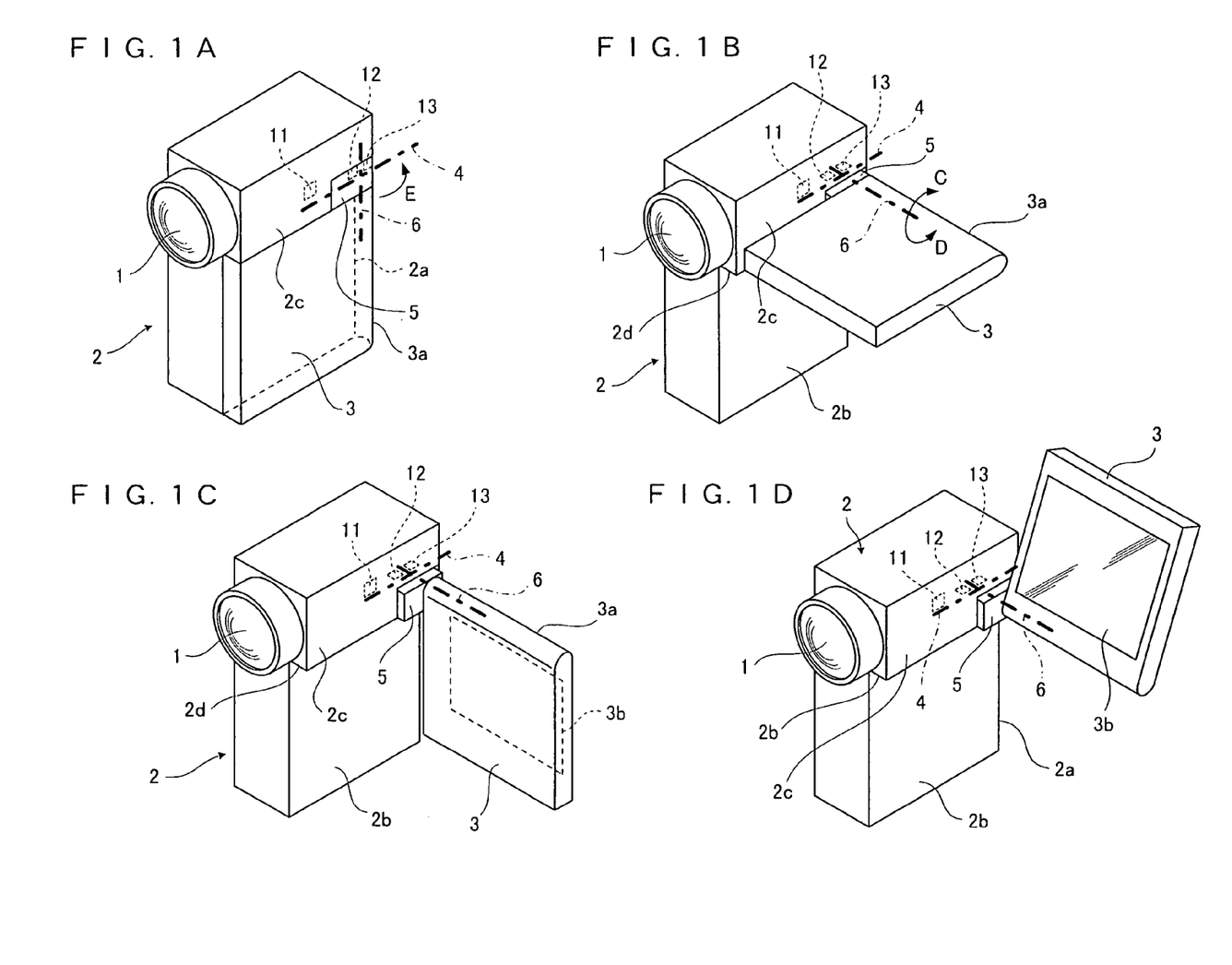
FIG. 1A is a perspective view of an image pick up and display device in a vertical position according to an embodiment of the present invention, showing a folded state of a display unit.
FIG. 1B is a perspective view of an image pickup and display device in a vertical position according to an embodiment of the present invention, showing a state in which the display unit is erected upright from the folded state.
FIG. 1C is a perspective view of an image pickup and display device in a vertical position according to an embodiment of the present invention, showing a state of picking up an image of a general subject.
FIG. 1D is a perspective view of an image pick up and display device in a vertical position according to an embodiment of the present invention, showing a state of picking up an image of a user.

FIG. 1 is a schematic perspective view showing a structure of an image pickup and display device according to an embodiment of the present invention.

Figure 2A:
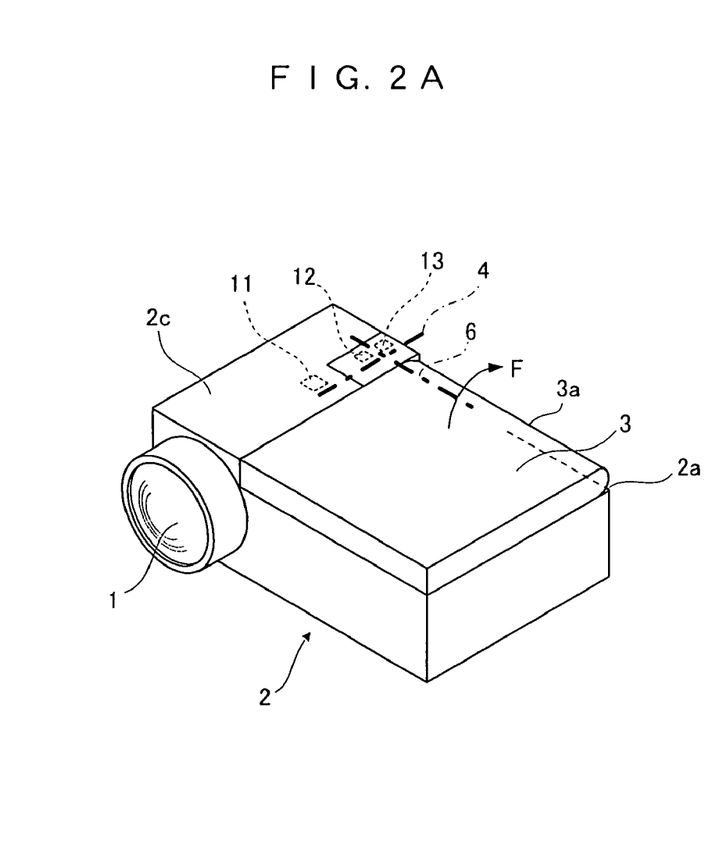
FIG. 2A is a perspective view of the image pick up and display device in a horizontal position according to the embodiment of the invention, showing a folded state of the display unit.

As shown in FIG. 1A and FIG. 2A, the image pickup and display device includes a substantially rectangular body 2 having image pickup means including an image pickup lens 1 and a recording medium which is not shown. The image pickup and display device also includes a substantially rectangular display unit 3. The display unit 3 can display images taken by the image pickupmeans. The display unit 3 is disposed such that a side thereof in the longitudinal direction extends along a side of the body 2 in the longitudinal direction in a folded position in which the display unit 3 is in close contact with the body 2 (including a case in which the display unit 3 abuts against the body 2 or close to the body 2). The image pickup and display device also includes a first rotation shaft 4 disposed such that its axis extends along one side surface of the body 2, a rotation-supporting mount 5 rotatably attached to the body 2 through the first rotation shaft 4, and a second rotation shaft 6. The second rotation shaft 6 is disposed perpendicularly to the first rotation shaft 4 in the rotation-supporting mount 5. The second rotation shaft 6 rotatably supports the display unit 3 with respect to the rotation-supporting mount 5. The second rotation shaft 6 or a portion thereof which connects the rotation-supporting mount 5 and the display unit 3 to each other extends along a side 3a of the display unit 3 and along a side 2a of the body 2 when the display unit is folded. The first rotation shaft 4 which connects the body 2 and the rotation-supporting mount 5 to each other is disposed at a position closer to the image pickup lens 1 than a central portion (upper portion in FIG. 1A). A concrete structure of the first and second rotation shafts 4 and 6, and the rotation-supporting mount 5 which connect the body 2 and the display unit 3 to each other may be substantially the same as a shaft rotation structure disclosed in patent document 2 (Japanese Patent Application Laid-open No. H10-285444).

The image pickup and display device can be handled in the vertical position suitable for image pickup and carrying as shown in FIG. 1A to FIG. 1D, and also be stably disposed on a table or the like in a horizontal position such that a surface of the image pickup and display device opposite from the display unit 3 is directed downward. As shown in FIG. 1A and FIG. 2A, an outer shape of the display unit 3 except a side thereof facing the rotation-supporting mount 5 in the display unit 3 is substantially overlapped with an outer shape of the body 2 as viewed from a direction substantially perpendicular to a display surface 3b of the display unit 3 (from above in FIG. 2A). The display unit 3 is large in size such that the display unit 3 extends substantially the entire surface of a side surface of the image pickup and display device (a portion of the image pickup and display device which becomes a side surface in a state shown in FIG. 1A) except a portion of the image pickup and display device where the image pickup lens 1 and the like are disposed. Therefore, an accommodation flat surface portion 2b in the body 2 where the display unit 3 is disposed in a closely contact state is recessed as compared with a base portion 2c where the image pickup lens 1 and the like are disposed, but the accommodation flat surface portion 2b is simply a flat surface so that each side of the display unit 3 can directly be grasped from outside. Although it is not illustrated in the drawings, a recess may be formed such that a slight gap is generated between the display unit 3 and the accommodation flat surface portion 2b in the folded state. The accommodation flat surface portion 2b may be provided with various operation buttons or the like.

The display unit 3 can turned between the folded state where the display unit 3 comes into close contact with the body 2 around the first rotation shaft 4 as shown in FIG. 1A and the upright position where the display unit 3 stands upright with respect to the body 2 as shown in FIG. 1B. The image pickup and display device is assembled such that the display unit is urged by the first rotation shaft urging means toward the folded state at a position close to the folded state in an intermediate position between the folded state and the upright position, and is urged toward the folded state at a position close to the upright position. First rotation shaft position detecting means 11 is provided near the first rotation shaft 4. The first rotation shaft position detecting means 11 detects that the first rotation shaft 4 rotates to a predetermined position and the display unit 3 erects upright.

Figure 2B:
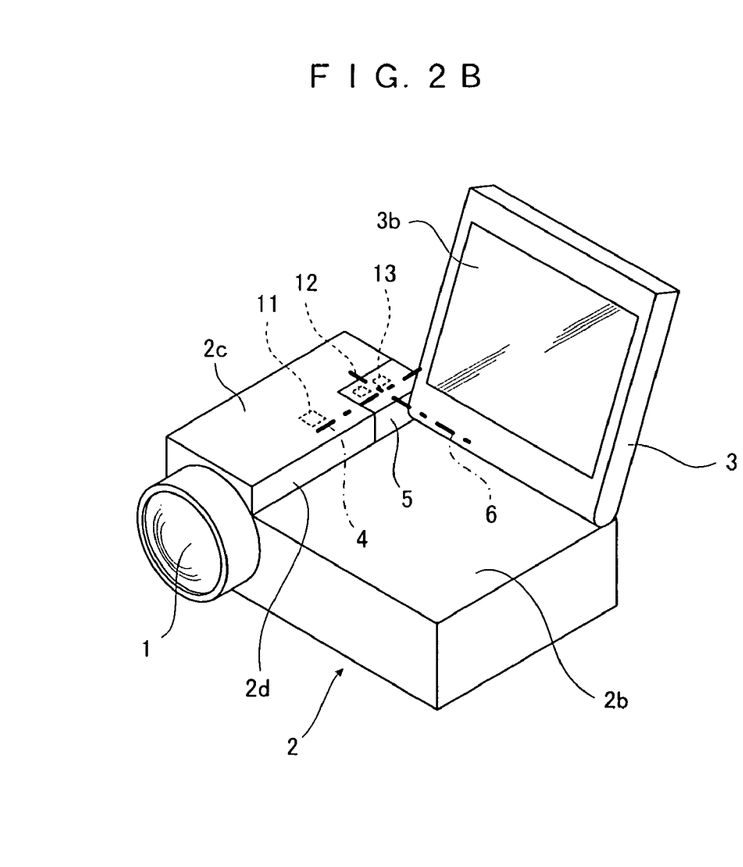
FIG. 2B is a perspective view of the image pick up and display device in a horizontal position according to the embodiment of the invention, showing a state in which the display unit is erected upright from the folded state.

The display unit 3 can rotate around the second rotation shaft 6 through 180° or greater. That is, the display unit 3 can rotate around the first rotation shaft 4 from the folded state to the upright position shown in FIG. 1B, and then rotate around the second rotation shaft 6 through 900 or greater in the direction C shown in FIG. 1B. With this, a user can view the display surface 3b of the display unit 3 from front to which the image pickup lens 1 is directed. The display unit 3 can rotate around the second rotation shaft 6 through about 90° in the direction D from the upright position shown in FIG. 1B. With this, the user can view the display surface 3b of the display unit 3 from behind from the direction opposite to the direction to which the image pickup lens 1 is directed as shown in FIG. 1C. The display unit 3 can maintain its position around the second rotation shaft 6 at any angle, but the display unit 3 is slightly urged by urging means such that the display unit 3 can easily be positioned at a predetermined center angle shown in FIG. 1B (where the display unit 3 is positioned substantially horizontally in a state where the display unit 3 erects with respect to the body 2 as shown in FIG. 1B). A second rotation shaft first position detecting means 12 and a second rotation shaft second position detecting means 13 are provided near the second rotation shaft 6 in the rotation-supporting mount 5. The second rotation shaft first position detecting means 12 detects that the second rotation shaft 6 is rotated in the direction C from a position shown in FIG. 1B. The second rotation shaft second position detecting means 13 detects that the second rotation shaft 6 is rotated in the direction D from the position shown in FIG. 1B. The second rotation shaft first position detecting means 12 can also detect that the display unit 3 is rotated in the direction C as shown in FIG. 2B around the second rotation shaft 6 from the folded state shown in FIG. 2A. The image pickup and display device is also provided therein with display position changing means. This display position changing means changes a display position of the display unit in accordance with the position of the display unit 3 detected by the first rotation shaft position detecting means 11, the second rotation shaft first position detecting means 12 and the second rotation shaft second position detecting means 13. A urging force of the urging means which urges the rotation shafts 6 and 4 is adjusted such that a resistance caused when the display unit 3 is rotated around the second rotation shaft 6 becomes greater than a resistance caused when the display unit 3 is rotated around the first rotation shaft 4, so that the display unit 3 can be rotated around the first rotation shaft 4 with relatively small force.

In the above structure, when the user tries to take a picture of a general subject while viewing the display unit 3, the user rotates the display unit 3 around the first rotation shaft 4 from the vertical folded state as shown in FIG. 1A to erect the display unit 3 with respect to the body 2 as shown in FIG. 1B and then, rotates the display unit 3 around the second rotation shaft 6 in the direction D. With this, the user can take a picture of the general subject while viewing the display unit 3 which is directed rearward.

When the user tries to take his or her own picture while viewing the display unit 3, the user rotates the display unit 3 around the first rotation shaft 4 from the vertical folded state to erect the display unit 3 with respect to the body 2 as shown in FIG. 1B and then, rotates the display unit 3 around the second rotation shaft 6 in the direction C. With this, the user can take his or her own picture while viewing the display unit 3 which is directed forward. When the user wants to see the taken image instead of taking a picture (user can also see information such as other images stored in the recording medium), the body 2 is put on a table or the like in the horizontal position as shown in FIG. 2A, and the display unit 3 is rotated around the second rotation shaft 6 in a direction F to erect the display unit 3. With this, the display unit 3 can erect easily and in a stable state, and the user can see the display unit 3 excellently.

In any case, the positions of the first rotation shaft 4 and the second rotation shaft 6 are detected by the first rotation shaft position detecting means 11, the second rotation shaft first position detecting means 12 and the second rotation shaft second position detecting means 13. In each case, the display states can be switched substantially that an upper portion of the display unit 3 comes upper side in the display image.

According to this structure, the second rotation shaft 6 is disposed along the side 3a of the display unit 3 and along the side 2a of the body 2 when the display unit 3 is folded. Thus, a user can take a picture of a general subject or his or her own picture while viewing the display unit 3 as shown in FIG. 1C and FIG. 1D, and also can see the display unit 3 excellently even in a state in which the body 2 is put in the stable horizontal position as shown in FIG. 2B. When the user see the display unit 3 in the state in which the body 2 is put in the horizontal position, since it is only necessary to rotate the display unit 3 around the second rotation shaft 6, no labor is required, and operability is excellent. Since a large display unit which extends over substantially the entire surface of the body 2 except the base portion 2c where the image pickup lens 1 and the like are disposed can be used as the display unit 3, viewability is excellent.

In any case, the position of the second rotation shaft 6 is detected by the second rotation shaft first position detecting means 12 and the second rotation shaft second position detecting means 13. In each case, the display states can be switched so that an upper portion of the display unit 3 comes at an upper side of the display image. Thus, the display faces in a favorable direction and excellent operability is obtained in any using state. When the facing direction of the display unit 3 is changed around the second rotation shaft 6, a relatively large resistance is applied. This prevents the direction of the display unit 3 from being changed at the time of image pickup or viewing of display contents, and the display unit 3 is maintained in an excellent position.

Figure 3:
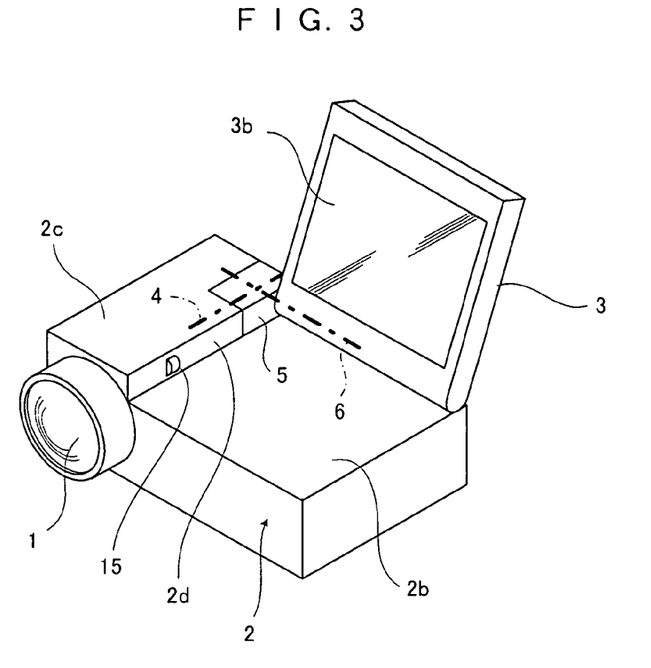
FIG. 3 is a perspective view of the image pickup and display device in a horizontal position according to another embodiment of the invention.
Figure 4A:
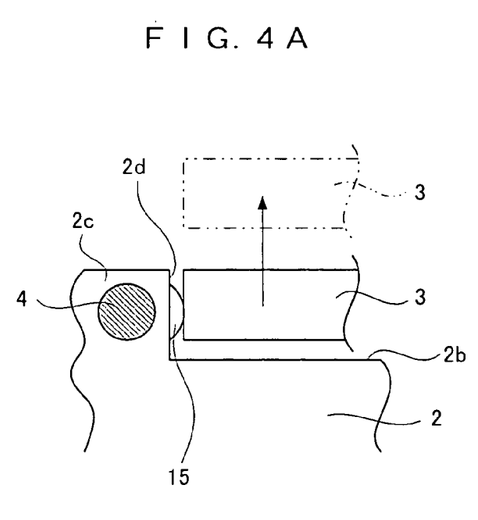
FIG. 4A is a front view of an essential part of the image pickup and display device, showing a state in which a display unit is rotated around a second rotation shaft.
Figure 4B:
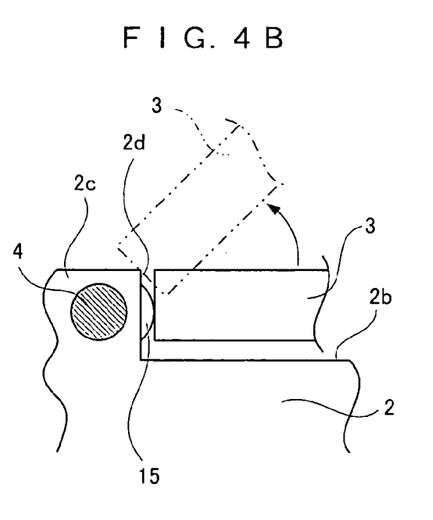
FIG. 4B is a front view of an essential part of the image pickup and display device, showing a state in which the display unit is rotated around a first rotation shaft.

FIG. 3 and FIG. 4 show another embodiment of the present invention. As shown in these drawings, an abutment projection 15 which maintains the display unit 3 in the folded state may be provided such as to project from a step 2d between the base portion 2c and the accommodation flat surface portion 2b toward the location of the display unit 3. The abutment projection 15 is curved into an arc shape around the first rotation shaft 4, and the abutment projection 15 is urged by resiliency of its member or urging means such that the abutment projection 15 projects from the step 2d.

According to this structure, when the display unit 3 is opened around the second rotation shaft 6, a side end surface of the display unit 3 moves upward in a state in which the display unit 3 abuts irrespective of the arc surface of the abutment projection 15 as shown in FIG. 4A. Therefore, relatively large force is required for opening the display unit 3. On the other hand, when the display unit 3 is opened around the first rotation shaft 4, the side end surface of the display unit 3 moves upward while rotating along the arc surface of the abutment projection 15 as shown in FIG. 4B, the display unit 3 can be opened with small force. With this structure, a load required for opening the display unit 3 can be varied depending upon the opening direction in an extremely simple manner, and operability is enhanced.

The image pickup and display device of this invention can be applied to various display devices with which a user can view a display unit in various positions.

What is claimed is:

1. An image pickup and display device, comprising:
    a body comprising image pickup means;
    a display unit for displaying an image on a display surface;
    said display unit having a longitudinal side extending along a longitudinal side of the body in a folded state in which the display surface of the display unit is in close proximity to a first surface of the body;
    a first rotation shaft having an axis extending along a surface of the body and rotatably supporting the display unit;
    a second rotation shaft extending perpendicularly to the first rotation shaft and rotatably supporting the display unit; and
    a rotation-supporting mount attached to the body, and rotatably supporting the first rotation shaft and the second rotation shaft;

wherein the display unit is openable from a folded state, to an upright state, such that the display surface is upright with respect to first surface of the body when the first surface of the body is substantially horizontal, the display unit openable by rotating the display unit around each of the first rotation shaft and, the second rotation shaft.

2. The image pickup and display device according to claim 1, wherein the display unit is formed such that an outer shape of the display unit except a side facing the rotation-supporting mount is substantially overlapped with an outer shape of the body as viewed from a direction perpendicular to a display surface of the display unit.

3. The image pickup and display device according to claim 1, further comprising:
   first rotation shaft position detecting means for detecting a position of the first rotation shaft;
   second rotation shaft position detecting means for detecting a position of the second rotation shaft; and
   display position changing means for changing a display position of a display screen in accordance with the position detected by the first and second rotation shaft position detecting means.

4. The image pickup and display device according to claim 1, wherein an abutment projection which abuts against the display unit when the display unit is folded is formed in an arc shape curving around the first rotation shaft.

5. An image pickup and display device, comprising:
   a body comprising image pickup means,
   a display unit comprising a display surface for displaying an image, and
   a rotation-supporting mount for rotatably connecting said display unit to said body, such that the display unit has a closed position in which the display surface is adjacent to a first surface of the body and an open position in which the display surface is not adjacent to the first surface of the body;
   wherein the rotation-supporting mount is a nexus for three axes, X, Y, and Z, the axes being perpendicular to each other,
   the X and Y axes form a plane that is parallel to the first surface of the body when the display unit is in its closed position, and
   the display unit is openable from the closed position along both the X axis and the Y axis, and is openable by rotating the display unit along either of the X or Y axes, respectively.

* * * * *